Sept. 10, 1929.    J. NELSON    1,727,406
METHOD FOR CUTTING PIPE
Filed June 21, 1926
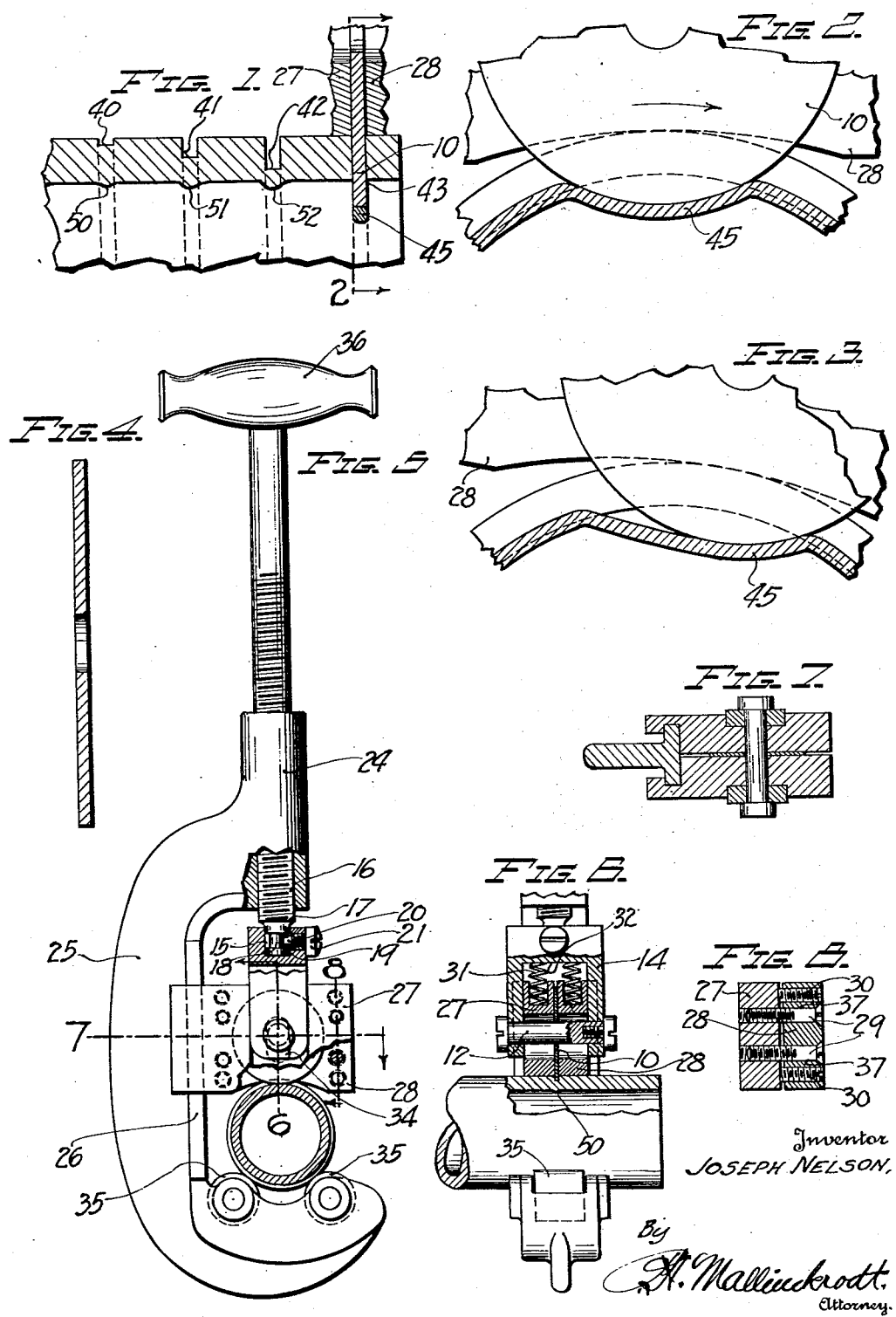
Inventor
JOSEPH NELSON,
By
H. Mallinckrodt.
Attorney.

Patented Sept. 10, 1929.

1,727,406

UNITED STATES PATENT OFFICE.

JOSEPH NELSON, OF SALT LAKE CITY, UTAH.

METHOD FOR CUTTING PIPE.

Application filed June 21, 1926. Serial No. 117,443.

This invention relates to an improved method for cutting metals of all kinds, and more especially metals in such forms as pipes and tubes, though its use is not necessarily restricted thereto. Its principal objects are:

First. To leave the ends of the metal after cutting, substantially plane and smooth.

Second. To leave only an extremely light burr on the inside of a pipe after the cut is completed, this burr being quickly removable by light reaming.

Third. To render the cutting of pipe more rapid and less laborious than is the case by former methods.

Fourth. To be suitable for cutting electrical conduit, leaving the ends true and smooth, as required by the rules and regulations of the National Board of Fire Underwriters.

Briefly, the method consists in forming a groove in the outside of the pipe and simultaneously, an incipient bead on the inside of the pipe. The depth of the groove and the size of the incipient bead are simultaneously increased in successive stages, until the last stage is reached, when the bead is completed and severed from both sections of the pipe.
To accomplish this, I employ a tool having a novel cutter consisting of a comparatively thin disk, preferably made of hardened steel, circular in form and having a cylindrical face whose two edges serve to operatively define two shearing planes. The disk is mounted so that its cylindrical face may be rolled against and into, the body to be cut. Thus, the characteristic and distinctive part of the present invention consists in the method of cutting metals, by simultaneously establishing two shearing planes, spaced apart from, and substantially parallel to each other, and removing the belt or zone of material from between the shearing planes by exerting a direct, rolling, compressive stress upon the surface of the said belt or zone sufficient to displace it, the displacement being in a direction substantially perpendicular to the surface at the point of application of the cutter. The cutter may be supported sidewisely by means of two cheek blocks spaced apart from each other just sufficient to allow the cutter to rotate freely between them. The bearing faces of the blocks may be yieldingly held against the work by means of compression springs, and be so disposed that the cutter may be fed down between the blocks, into the work. The cheek blocks furnish a lateral support for the cutter near its circumferential point, where the cutting action takes place, such support being very necessary to prevent the buckling of the cutter when it engages the work. The cheek blocks together form a jaw which bears against the work as above described. This jaw is slidably mounted on the frame and is supported in a fork which may be raised and lowered by means of a threaded stem provided with a T-handle for forcing the cutter into the work.

The arrangement of the frame in which the cutter is mounted, is in general, similar to that of ordinary hand-operated pipe cutting tools, but the cutting wheel itself and the block in which it is mounted, are both distinctly different from anything of which I am aware. In contrast to the results accomplished by means of this invention, the cutting of pipe with ordinary cutters which have a sharp edge at the vertex of a V-shaped face, will at once make this difference apparent, even to the casual observer. In the ordinary cutter, the sharp edge of the V is wedged down into the work when cutting, thus causing a crowding or flow of the metal sideways in each direction from the cutter, requiring much force to accomplish, and resulting in an accentuated beveled face on the end of each of the severed pieces of pipe, besides leaving a very heavy mass of metal on the inside of each piece. This necessitates laborious reaming and squaring before the pipe is fit to use, and never makes a workmanlike job. For work requiring any considerable degree of mechanical perfection, as for example, cutting of electrical conduit, the use of the ordinary cutter is prohibitive, and the conduit in consequence, must ordinarily be cut by much more expensive methods, for instance, a hack saw, or in a lathe.

By use of the present invention, all classes of work may be done to equal degrees of perfection, and at a minimum expenditure of time and effort.

The features of this invention for which the protection of Letters Patent is desired, are collectively grouped in the claims which conclude this specification.

In the drawing, which illustrates a tool for carrying this invention into practice:

Fig. 1 represents a longitudinal section of a fragment of pipe, enlarged, indicating various stages in the cutting operation.

Fig. 2, a cross-section on line 2 in Fig. 1, indicating one certain stage in the cutting.

Fig. 3, the position of the cutter relative to the pipe, somewhat later than the stage shown in Fig. 2.

Fig. 4, a cross-section of the cutter, enlarged.

Fig. 5, a side elevation of the complete tool in the operating position on the pipe, parts of the tool being broken away to show sections.

Fig. 6, a fragmentary front elevation, some parts being in section on line 6 in Fig. 5; and Figs. 7 and 8, sections taken in the planes indicated by lines 7—7 and 8—8, respectively, in Fig. 5, parts in the background being omitted.

Referring to the drawing, 10 represents the cutter which is journaled on the pin 12, the latter being carried in the fork 14. In the top of the fork 14 is a recess 15, for accommodating the reduced end of the stem 16. This reduced end comprises the shoulder 17, the neck 18, and the head 19, defining together a groove for engaging the tip 20 of the screw 21. The stem 16 is threaded in the barrel 24, forming an integral part of the frame 25. The frame 25 also carries the guides 26, upon which is slidably mounted the upper jaw composed of cheek blocks 27 and 28. The cheek blocks are spaced apart from each other to accommodate the cutting disk 10 between them, and are adjustably connected to each other by the screws 29. Screws 29, in this instance, pass freely through the holes 37 and are threaded in the block 27, while the screws 30 are threaded in the block 28 and bear against the inner face of the block 27. By loosening the screws 30, the blocks may be drawn together to just the right bearing against the sides of the cutter 10 by means of the screws 29. The screws 30 may then be tightened, which results in a definite and rigidly held spacing of the blocks 27 and 28, relative to each other. In the upper parts of the blocks 27 and 28 are compression springs 31, which bear against the inner face 32 of the fork 14, and are operative to push the jaw 27—28 away from the fork, the slot 34 allowing a certain limited movement between the jaw and the fork.

In using this tool, the pipe to be cut is placed against the rollers 35, while the jaw 27—28 is brought down by means of the screw 16 with its T-handle 36, until the cutter contacts the pipe. The screw 16 is then advanced a little farther, this action forcing the cutter slightly into the pipe structure. By revolving the tool around the pipe, a cut will be made to a uniform depth as indicated in Fig. 5. This first cut is represented in enlarged cross-section at 40 in Fig. 1, the incipient forming of the bead which is finally severed, being clearly perceptible. By again forcing the cutter 10 into the pipe a limited distance, and revolving the tool another turn, the groove will be cut to a depth such as is indicated at 41 in Fig. 1. A third similar operation results in the groove indicated at 42. When this depth has been reached, the cutter in being forced down, breaks through the pipe, as shown in Fig. 2. By again revolving the tool, the cut is finished. This last shearing operation may be clearly understood from Figs. 2 and 3. Supposing the cutter 10 to move in the direction of the arrow in Fig. 2, it soon thereafter reaches the position shown in Fig. 3, the action of the cutter in continuing around the pipe, being to completely sever it by the removal of a bead, ring or zone of metal 45.

The stages in the cutting of a pipe indicated in Fig. 1, all take place successively to complete one cut, but are shown separately from each other to clearly indicate the effect of each individual stage. The effect of the first stage is the groove 40 and the slight annular corrugation or incipient bead 50, resulting from the initial shearing and the inward flow of the metal directly under the cutter. As a result of the second stage, the groove is deepened as at 41 and the incipient bead increased as at 51, while in the next stage, the groove is further deepened, as at 42, and the incipient bead increased still further as indicated at 52. At 43, the cutter has broken through the pipe as previously mentioned, and is completing and shearing off the bead 45. The completed operation leaves only a small burr which can be removed by the stroke of a file.

The stages as represented, are merely illustrative, and in practice will vary according to the nature of the work and the judgment of the operator.

The thickness of the cutting disc is important and should be proportioned to the work. If the cutter is too thin, it crumples; if too thick it crushes the work. As an example, a one-thirty-second inch disc cuts well if properly supported, and gratifying results have been achieved with a cutting disc one-sixteenth of an inch in thickness operating on ordinary two-inch wrought iron pipe.

The action of the ordinary V-cutter changes the molecular structure of the metal in its path by crowding the metal out of the way, thus causing great resistance to the passage of the cutter. This crowding forces the displaced metal to the inside of the pipe without detaching it therefrom, and results in the formation of objectionably heavy burrs. In the present method, the action of the cutting disk is to detach the displaced metal by means of a clean-cut shearing effect which by actual tests, requires less effort on the part of the operator than the crowding of the V-cutter.

By establishing two shearing planes at right angles to the surface of the material acted upon, practically the entire amount of material displaced, is also definitely removed and detached by the cutter, and therefore leaves the parts in substantially a finished condition.

The tool described, may be used to cut pipes of large sizes by hand, while the pipe which can be cut by the usual hand-operated cutters is limited to the smaller sizes.

While a specific embodiment of means for practicing this method is herein shown and described, it is to be clearly understood that the detailed parts thereof, may or may not, be in the preferred forms, and further, that the preferred forms may be varied from time to time depending upon the development of the invention and upon the progress of the art or arts to which it is incident. Therefore, that which is essential to, and characteristic of this invention, is discernible from the claims in which its spirit is generalized.

Having fully described my invention, what I claim is:

1. The method of cutting metal, consisting in forcing a disk less than one-sixteenth of an inch in thickness into the structure thereof, and simultaneously supporting said disk sidewisely, thus establishing two shearing planes spaced apart from and parallel to each other, substantially perpendicular to one surface of the metal, applying pressure to the said surface between said shearing planes sufficient to displace the metal therebetween, and removing the metal in the form of a bead from between said shearing planes.

2. The method of cutting pipe, consisting in forcing a disk less than one-sixteenth of an inch in thickness into the structure thereof, and simultaneously supporting said disk sidewisely, thus shearing a narrow zone of material from the pipe in successive rotative stages, said zone being located between the finished plane ends of the pieces into which said pipe is to be cut.

3. The method of cutting pipe, consisting in forcing a disk less than one-sixteenth of an inch in thickness into the structure thereof, and simultaneously supporting said disk sidewisely, thus removing a zone of material located between the adjacent ends of the pieces into which said pipe is to be cut, and forcing said zone of material in the form of a severed bead, inwardly of said pipe, thereby producing simultaneously, plane faces on the adjacent ends of the two pieces into which said pipe is cut.

4. The method of cutting pipe, consisting in forcing a disk less than one-sixteenth of an inch in thickness into the structure thereof, and simultaneously supporting said disk sidewisely, thus forming a groove on the outside of the pipe and an incipient bead on the inside of the pipe simultaneously, increasing the groove in depth and increasing the bead in size in successive simultaneous stages, and completing the bead in a final shearing off stage.

5. The method of cutting metal consisting in forcing a disk less than one-sixteenth of an inch in thickness into the structure thereof, and simultaneously supporting said disk sidewisely, thus grooving one surface of the metal so as to form an incipient bead upon the opposite surface, increasing the depth of said groove in successive stages, simultaneously increasing the said incipient bead in each of the said stages, and completing the bead in a final grooving stage.

6. The method of cutting pipe, consisting in forcing a disk less than one-sixteenth of an inch in thickness into the structure thereof, and simultaneously supporting said disk sidewisely, thus forming a groove in the outer surface of the pipe in a manner to simultaneously form an incipient bead upon the inside surface of the pipe, said incipient bead being substantially opposite the said groove; simultaneously increasing the depth of said groove and imparting growth to the said bead in successive stages until said growth results in the detachment of the finished bead from the said pipe.

7. The method of cutting pipe consisting in displacing a band of its constituent material inwardly thereof, the width of said band being less than one half the thickness of the wall of said pipe; continuing said displacement in successive stages, and detaching substantially the detached band in a final displacement stage.

In testimony whereof I sign my name hereto.

JOSEPH NELSON.